Aug. 8, 1967   F. L. BATES ETAL   3,334,432
METHOD OF AND MEANS FOR CHANGING A VISUAL DISPLAY
Filed Oct. 4, 1965   7 Sheets-Sheet 5

Freddie L. Bates
Arthur H. Reine
INVENTORS
BY
ATTORNEYS

United States Patent Office 3,334,432
Patented Aug. 8, 1967

3,334,432
METHOD OF AND MEANS FOR CHANGING A VISUAL DISPLAY
Freddie L. Bates and Arthur H. Reine, Houston, Tex., assignors to Bates, Reine & Associates, Houston, Tex., a partnership
Filed Oct. 4, 1965, Ser. No. 492,784
15 Claims. (Cl. 40—31)

ABSTRACT OF THE DISCLOSURE

A display device and a method of changing display sheets in the viewing area which includes three movable members each having a display sheet rolled therein and means for moving one of the members across the viewing area to change the display sheet exposed in the viewing area and the method steps therefor. This abstract is neither intended to define the invention of the application which, of course, is measured by the claims, nor is it intended to be limiting as to the scope of the invention in any way.

---

The present invention relates to an improved method of and means for changing messages in a visual display in sequence and specifically to changing such messages in a manner which progresses across a viewing area in the same direction for each change.

An object of the present invention is to provide an improved method of and means for changing messages in a display device in which at least three messages are to be made visible, one at a time in sequence, by the simultaneously laying down of one message while taking up another message from the viewing area with said change in messages progressing across the viewing area.

Another object of the present invention is to provide an improved method of and means for changing messages in a display device in which the displayed message is taken up while the new message is laid down and thereafter the message taken up is returned to the opposite side of the display device in position to be laid down in sequence to replace another message.

Still another object of the present invention is to provide an improved method of and means for changing messages in a display device in which the messages are releasably secured between movable members and the messages are changed by moving one of the movable members across the viewing area to pay out a new message and take up the old message from the viewing area, the taken up message being thereafter transferred to its movable member and disconnected from the take-up member for return to the opposite side of the viewing area to be laid down in the viewing area in sequence.

A further object of the present invention is to provide an improved method of and means for changing display messages in a display device including displaying the messages in a viewing area while connected between movable members, taking up one message while laying down another message in the viewing area by movement of a movable member across the viewing area in one direction, detaching the message from one movable member and returning the movable member with the message to the originating side of the viewing area.

A still further object of the present invention is to provide an improved display device having display sheets connected between movable members and displayed when the movable members are moved apart across a display opening with the sheets being detachably connected to one of the members to allow the members to be moved independently to the originating side of the display device.

These and other objects of the present invention are more fully explained and set forth in the following specification in relation to the drawings wherein.

Display devices which are used for the display of messages for the advertising of products or services are effective only if they are seen and noticed. Movement in a display device will attract some attention. It is desirable to attract a maximum attention and one way to attract additional attention is to change the message in a manner which will have the most interest to a person viewing the change. It is thought that to provide a messag change in which the old message appears to be erased while a new message is being added would provide a maximum amount of attention attraction. By erasing a message it is meant that the message disappears behind a member moving across the message viewing area, while the new message is being put in its place giving the appearance of having been painted by the member over the old message.

Figures 1, 2:
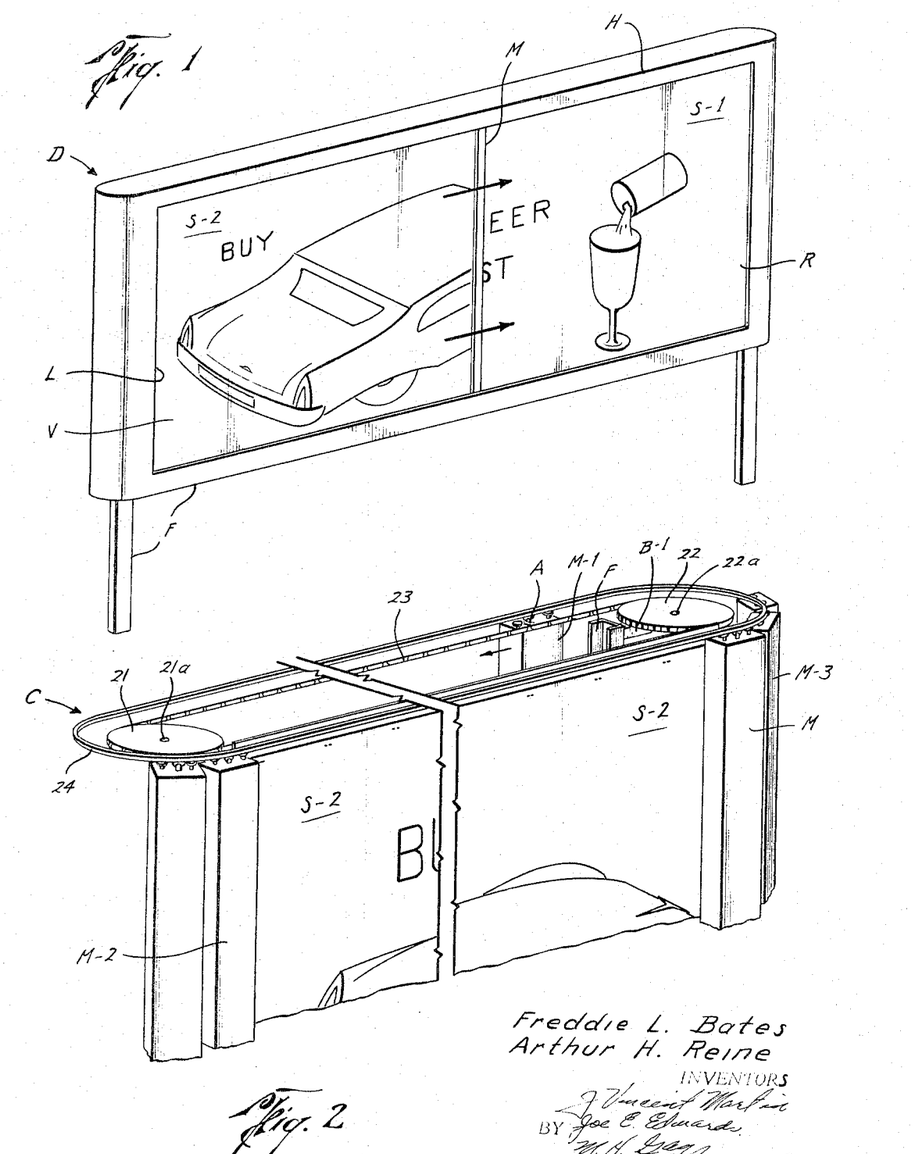
FIGURE 1 is a perspectve vew of a display device constructed in accordance with the present invention and showing a stage in the process of changing display messages in accordance with the method of the present invention.
FIGURE 2 is a partial perspective view of the interior of the display device illustrated in FIGURE 1.

By the present invention it is possible to change messages in a display with the change always progressing across the viewing area in the same direction by erasing the old message while adding the new message in one of two ways. The new message may be laid down as the member progresses across the viewing area while the old message is being rolled up into the member, as shown in FIGURE 1, or the new message may be pulled from the departure side of the viewing area by the movable member, for example, in the manner as a window shade is pulled downwardly to cover a window, while the old message is being rewound on a roll in the member. Each of these ways of changing messages has some attention attraction value and the present invention provides the improved method of and means for changing the messages visible in a display device for both of the above-described ways of changing messages.

As illustrated in FIGURE 1, the display device D constructed in accordance with the present invention is provided with a frame F and suitable housing H, if desired, to protect the parts of the device and has a viewing area V. As illustrated, the first message on display sheet S-1 is in the process of being erased or taken up, while a second message on display sheet S-2 is being laid down in the viewing area by the movement of the movable member M across the viewing area V in the direction indicated by the arrows. The changing of the messages by the movement of movable member M across the viewing area V may be better understood by stating that as the member M moves, it takes up the first message S-1 commencing at the left in the illustrated example and progressing to the right until all of the first message S-1 is within the movable member M. At the same time it dispenses the second message S-2 with the left side of the message S-2 being positioned at the left side of the viewing area and laid out across the viewing area. The appearance of erasing the message S-1 behind the movable member M will be present when the display sheet of message S-1 is taken up into the movable member M. As stated, the message S-2 may be added in either of two ways, laid down progressively from left to right or window-shaded across the viewing area. In the illustrations the laying-down method of adding a new message has been illustrated and will be described first. Thereafter, the window shade method will be described along with the desirable changes in the device to utilize such second method of adding the new message to the viewing area.

While not shown in FIGURES 1 and 2, the message S-1 was attached at opposite ends to the movable members M and M-3, and the message S-2 is attached at opposite ends to the movable members M and M-2.

The display device illustrated in FIGURE 2 illustrates the completion of the movement of the movable member M across the view area with the frame and housing removed to illustrate generally the conveyor means C by which the movable member M was moved. This view also illustrates the movable member M-1 being moved from the arrival side R of the viewing area to the departure or originating side L of the viewing area and the arm A of the conveyor means C in engagement with the member M-1 for such movement. Movable member M-1 is positioned at the departure side L of the viewing area V in the same position which it occupied while member M was traversing the viewing area V.

The conveyor means C serves two functions, and such functions may be accomplished at the same time or separately. The movement of the movable members across the viewing area to change the message is one function of the conveyor means C, and the return of the individual movable members from the arrival side R of the viewing area V to the departure side L is the other function of the conveyor means C. The conveyor means C is illustrated as two endless chain conveyors and includes the drive means 20, upper and lower drive sprockets 21, upper and lower idler sprockets 22, upper and lower drive chains 23 in engagement with the respective sprockets 21 and 22, the upper and lower supports channel tracks 24 and 25 and the arms A.

Figure 3:
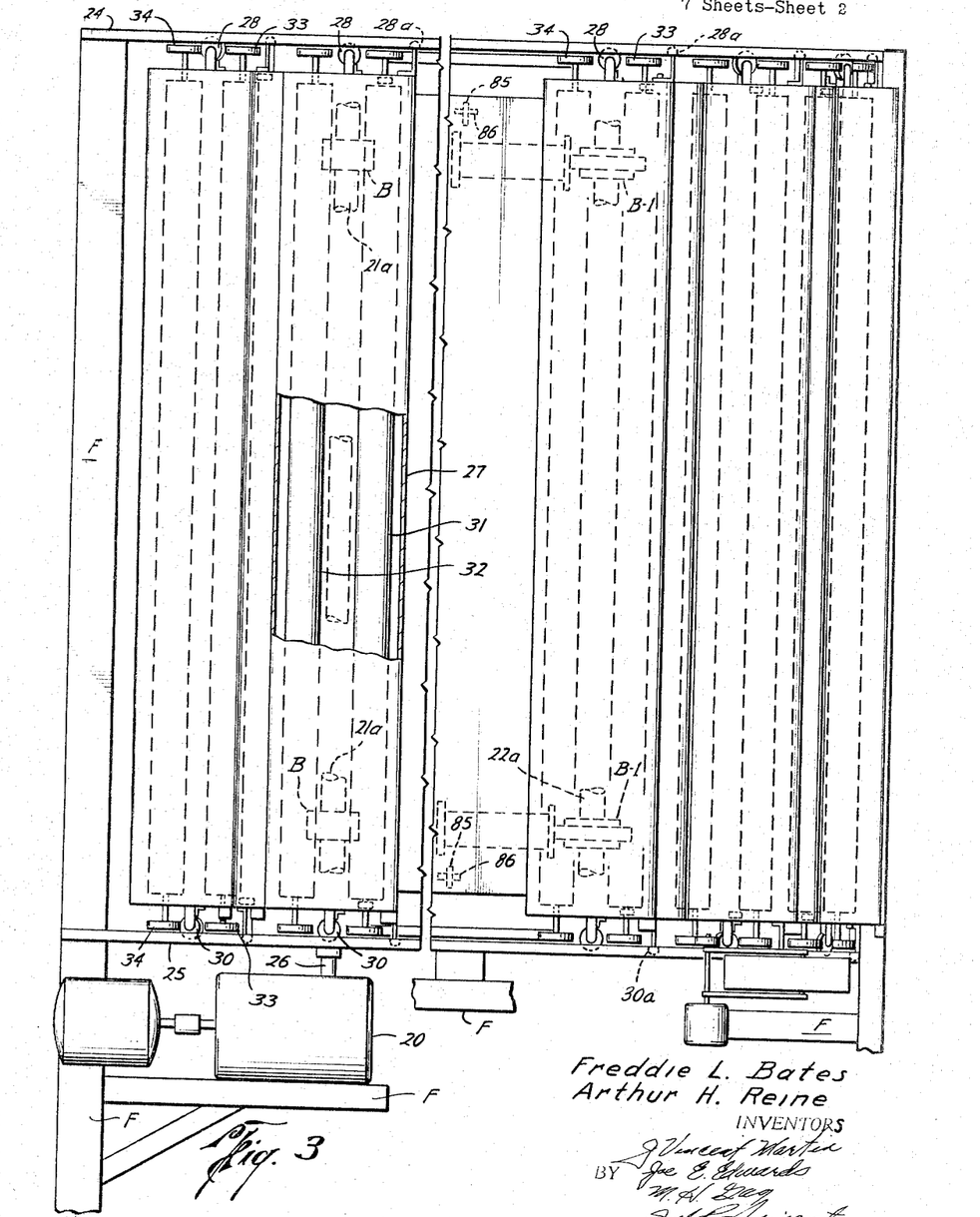
FIGURE 3 is an elevation view of the movable members of a display device of the present invention and the conveyor means of the present invention with the viewing area broken out to illustrate the details of structure more clearly.
Figure 4:
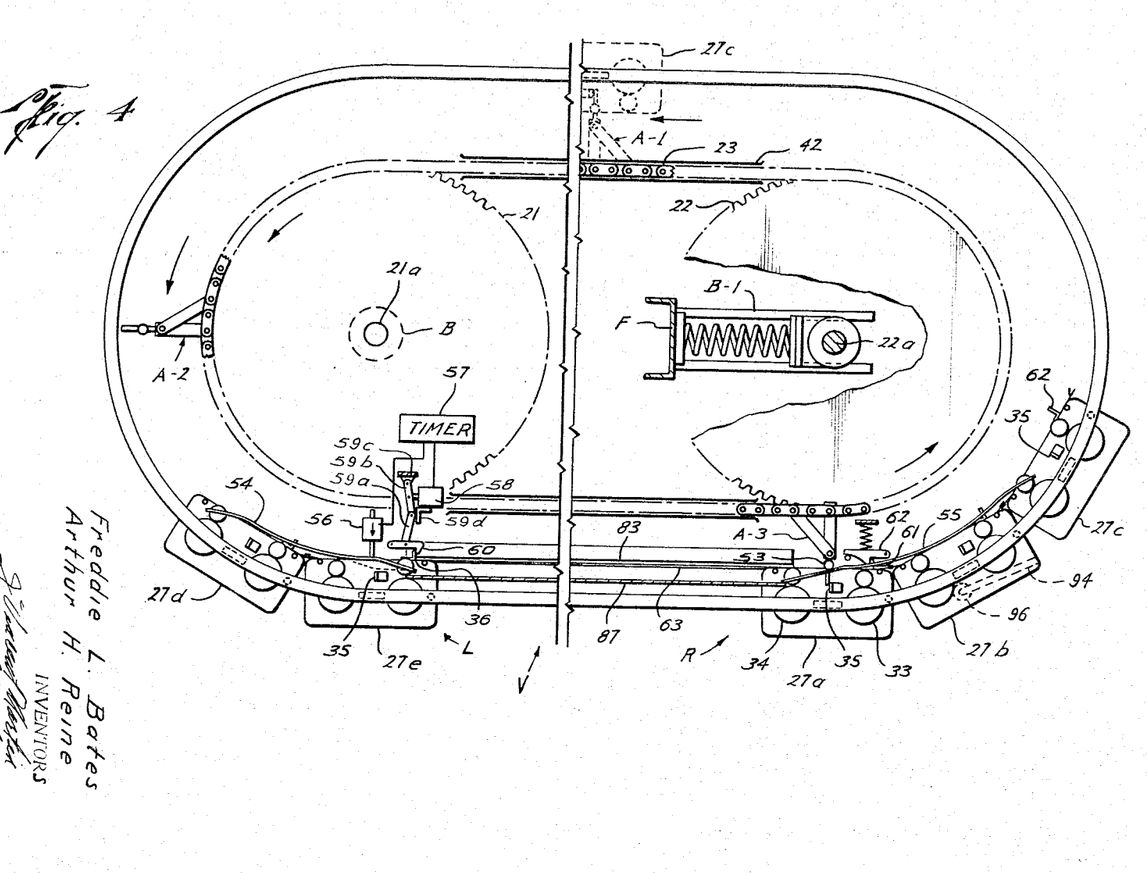
FIGURE 4 is a partial plan view of the display device of the present invention illustrating the movable members and the conveyor means for the movable members.

As seen in dashed lines in FIGURE 3, the shaft 21a on which the sprockets 21 are mounted is supported in the bearings B. The sprockets 22 are mounted on the shaft 22a which is supported in the spring loaded bearings B-1. The spring loaded bearings B-1, as seen in FIGURE 4, will urge the shaft 22a away from the shaft 21a to maintain the desired tension in the chains 23 between sprockets 21 and 22. The drive means 20 is connected to the drive sprockets 21 by the shafts 21a and 26. It is desired to have the drive means 20 rotating the shaft 26 and the drive sprockets 21 at all times when the display device is to be in operation. The arms A will be in motion at all times and control of their movement of the movable members will be as hereinafter set forth. It may be desired that each of the drive chains be provided with several of such arms A to allow the drive chain to be moving more than one movable member at one time. Generally, only one movable member will be positioned in the viewing area to change messages at one time. Control of the speed of movement of drive chains should be adjusted to have the most desirable speed for the changing of the messages in the viewing area.

The speed of the movable members moving across the viewing area to change the messages will set the speed of the conveyor means. It is necessary to have at least three movable members; i.e., one to be positioned at the departure side L of the viewing area V to hold the end of the new message S-2, one moving across the viewing area V to change the messages and one positioned at the arrival side R of the viewing area V to hold the end of the old messages S-1. With only three such movable members and with the speed of the conveyor means C established by the speed desired for changing messages, the duration of each message will be at least the time required to return one of the movable members from the arrival side to the departure side of the viewing area plus the time taken for rewinding of the message sheets.

The movable members are generally illustrated as being canisters 27 which have an upper roller 28 and upper guide roller 28a in rolling engagement within the upper track 24 and a lower roller 30 and lower guide roller 30a in rolling engagement within the lower track 25. Each of the canisters 27 illustrated is provided with two rolls, a take-up roll 31 and a dispensing roll 32. The shafts of the rolls 31 and 32 are suitably supported and journalled for rotation in both ends of the canister, and the portion of the shafts which extends beyond the ends of the canister is provided with wheels 33 and 34 fixedly secured thereto to cause the rolls 31 and 32 to be rotated as hereinafter more fully explained. Arm engaging clips 35 are positioned on both the top and bottom of each canister 27 and the position lock clips 36 are positioned on the back side of each canister 27 near the top and bottom ends.

Figure 7:
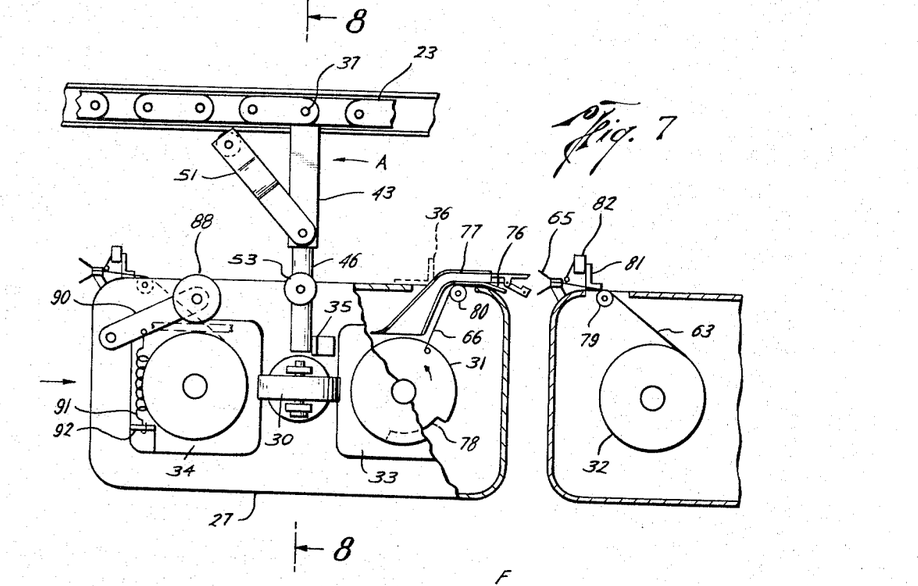
FIGURE 7 is an enlarged plan view of two movable members with one member approaching another member and the arm moving one of the members.
Figures 8, 9:
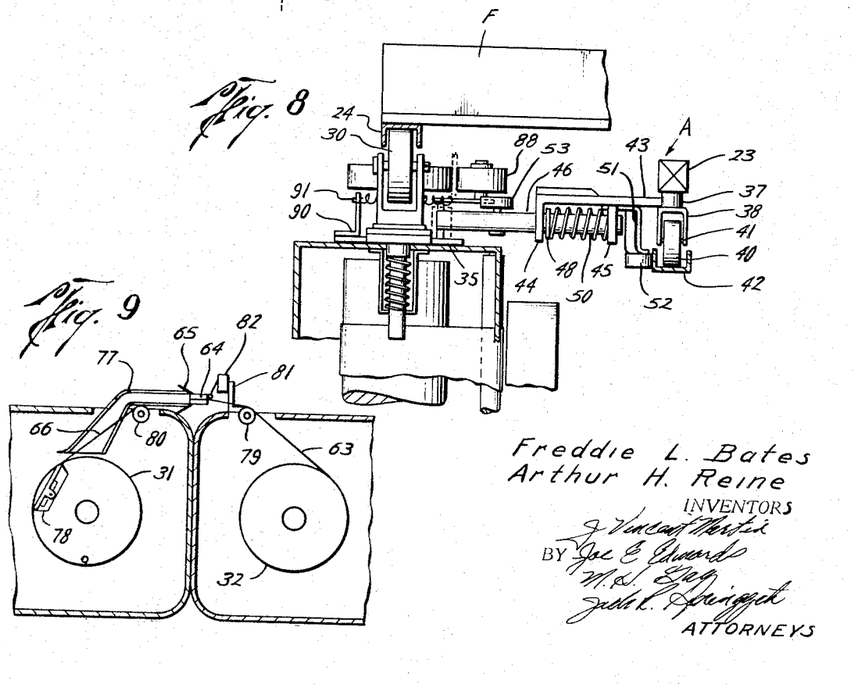
FIGURE 8 is a sectional view of the conveyor means and movable member structure taken along line 8—8 in FIGURE 7.
FIGURE 9 is a detail plan view of two movable members and illustrating a display sheet extending between such two movable members.
Figures 10, 11:
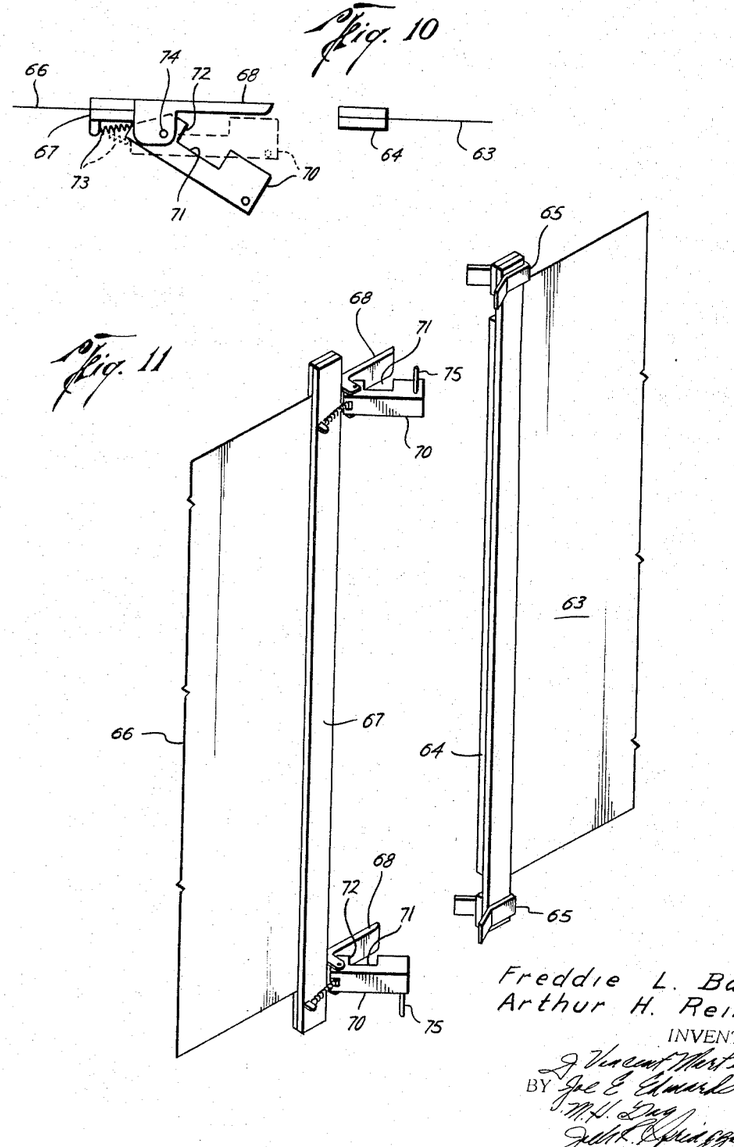
FIGURE 10 is an enlarged plan view of the releasaable latching mechanism used to provide connection of one end of the display sheet from one movable member to a leader in another movable member.
FIGURE 11 is a perspective view of the releasable latching mechanism for connecting the end of a display sheet with the leader from the take-up roll in a movable member.

The clips 35 are engaged by the arms A and the movement of the arms A by their connection to the chains 23 is transmitted to the canisters 27. The arms A are connected to the chains 23 as best shown in FIGURES 7 and 8. One of the links of the chain is connected by pin 37 through the chain to the roller support 38 which engages the shaft 40 of the roller 41. The roller 41 is positioned in the channel 42 to ride therein to position the chain 23 between the sprockets 21 and 22 in a substantially straight line. The arm A includes the bracket 43 which is connected to the pin 37 and extends outwardly therefrom at substantially a right angle from the chain 23. The legs 44 and 45 depend from bracket 43, and legs 44 and 45 are provided with holes to receive the member 46 which is sufficiently long to extend through the leg 44 and reach into engagement with one of the clips 35. The member 46 slides through the hole in leg 45 and through the hole in leg 44 as it is retracted. The inner end of member 46 is provided with a collar 48 which will prevent it from passing through the hole in the leg 44 and also which provides a shoulder engaging one end of the spring 50. The spring 50 surrounds the member 46 and abuts the outer side of the leg 45 to urge the member 46 outwardly. The brace 51 connects to the outer part of the bracket 43 and extends to connect to the chain 23 at an angle in a plan view, and also extends downwardly to support the wheel 52 in rolling engagement with the outside surface of the channel 42. The angle of the brace 51 with respect to the bracket 43 will always extend in the opposite direction from the direction of movement of the chain 23 so that when the arm A engages one of the clips 35 to move a canister 27, brace 51 will provide sufficient rigidity to arm A to accomplish the movement of the canister 27 without excessive bending.

Thus, if for any reason a canister sticks in its movement, the brace 51 and the contact of the wheel 52 against the side of the channel 42 will provide sufficient rigidity to continue to engage the clip 35 and urge the canister forward in the desired direction of movement.

Further, the arm A is provided with a cam wheel 53 mounted on the tubular member 46. By providing suitable tracks, such as the tracks 54 and 55 illustrated in FIGURES 4, 5 and 6, they will be engaged by the cam wheel 53, and by the particular positioning of such tracks 54 and 55, the engagement of them by wheel 53 will cause the tubular member to retract from engagement with the clip 35 to thereby discontinue the movement of the canister and also will allow the tubular member to telescope outwardly to engage a clip 35 for movement of a canister.

Referring to FIGURE 4, it can be seen that as the arm A-1, which is moving canister 27c, approaches the departure side of the viewing area, the cam wheel 53 will engage the track 54 and be retracted out of engagement with the clip 35 on the canister 27c to thus position the canister 27c in engagement with the canister 27d for purposes hereinafter more fully set forth. Additionally, a portion of track 54 is movable by the solenoid 56 in response to the timer 57. By operation of the timer 57 and the solenoid 56, the track 54 is changed to allow the member 46 of an arm A to move inwardly at the time desired to enter engagement with a clip 35 on canister 27e to move such canister across the viewing area. The solenoid 58, which is also controlled by the timer 57, actuates the latch 60 which normally engages the clip 36 on the canister in the departure position to prevent premature movement of such canister into the viewing area.

The solenoid 58 is connected to the latches by the arms 59a and 59b. The arms 59a and 59b are pivotally connected to each other and are pivotally connected at their opposite ends to latch 60 and lug 59c, respectively. When latch 60 is in engagement with clip 36 arms 59a and 59b are positioned as shown in FIGURE 4 against the stop 59d which will resist any force tending to release latch 60.

The track 55 also engages the cam wheel 53 to move the tubular member 46 out of engagement with the clip 35 once a canister has been moved completely across the viewing area and the clip 36 has been engaged by the spring loaded latch 62. The latch 62 will prevent movement of the canister 27 back into the viewing area once it has crossed the viewing area to the arrival side. It should be noted that the latch 62 is pivoted at one end and will be moved by engagement of the edge of the clip 36 on its under outer surface inwardly until the clip 36 passes into its recessed portion, at which time the spring urges the latch outwardly into a latching engagement with the clip 36.

In FIGURE 4 the movement and positions of the individual canisters of the present invention are illustrated. For example, the canister 27a is in position at the arrival side R of the viewing area V and its clip 36 has been engaged by the latch 62. The wheel 53 of arm A-3 is in engagement with the track 55, and tubular member 46 of arm A-3 is substantially completely retracted out of engagement with the clip 35. The canister 27b is positioned in the rewind position. The canister 27c is in position for movement around the track back to the departure side L of the viewing area V. It should be noted that the end of the track 55 near the canister 27c is bent outwardly to allow the member 46 to extend outwardly into engagement with the clip 35 on the canister 27c. In the upper portion of FIGURE 4, it is seen in dashed lines that arm A-1 has moved the canister 27c around the back side of the device, and in the left-hand side of the picture illustration, also the canister 27d is shown in position in engagement with the canister 27e with an arm A-2 moving forward to possibly engage the canister 27e to move it across the viewing area assuming that the timer actuates the solenoid 56 to move the movable portion of the track 54 outwardly to allow engagement of the arm A-2 against the clip 35 of the canister 27e. The two solenoids 56 and 58 are actuated by the timer 57 at relatively the same time so that when an arm A is allowed to engage the clip 35 on one of the canisters for movement across the viewing area, the latch 60 is released from the clip 36.

In FIGURE 4 the canister 27c is shown in two different positions. If additional canisters are to be added to a unit, the configuration of the track 54 and possibly the configuration of the track 55 should be changed to provide for the storage of additional canisters. For example, if one more canister is to be used, then the track 54 should be extended around the track to the left and upwardly in FIGURE 4 to allow one more canister to be deposited and the arm engaging the canister to be retracted as soon as it comes into engagement with the canister 27c as shown. Also, the track 55 may be extended to the right and upwardly around the track to allow additional canisters to be stored on the arrival side of the device.

A suitable releasable latching means is needed to provide connection for the message or display sheet between adjacent canisters so that the sheet may be unrolled and have both ends attached to the canisters between which the message is spread. A releasable latching means is illustrated in FIGURES 7, 9, 10 and 11. The end of message sheet 63 is attached to the bar 64. The brackets 65 are secured to the canister in which the message sheet 63 is installed to hold the bar 64 in position for latching when the message sheet 63 has been wound upon a roll 32. The remaining portion of the latch mechanism is attached to the leader 66 which extends from a roll 31. The end of the leader 66 is attached to bar 67. At each end of the bar 67 a fixed jaw 68 and a spring loaded movable jaw 70 are provided. The movable jaw 70 is provided with a recess 71 in which the bar 64 is adapted to be received. Engagement of the latching mechanism is accomplished when two canisters are moved together such that the bar 64 of the message sheet 63 is moved into the recess 71 and engages the shoulder 72 at the inner edge of the recess 71. Such engagement will cause the movable jaw 70 to move closed. As soon as it has moved the compression spring 73 past center on the pivot pin 74, the jaw 70 will move to the fully closed position responsive to the spring 73. This provides a latching engagement between the leader 66 and the message sheet 63.

The latching mechanism is opened simply by the engagement of the pin 75 with the cam surface 76 on the latch guide 77. The latch guide 77 will guide the latch mechanism into the canister area so that the latch mechanism and the bars 64 and 67 will be positioned in the recess 78 of the roller 31, as best shown in FIGURE 9. As the message sheet 63 is being rewound on the roll 32, the guide 77 will guide the latch mechanism as it moves out of the canister 27 so that the cam surface 76 will engage the inner surface of the pin 75 causing the movable jaw 70 to open, releasing its engagement with the bar 64 on the message sheet 63. This release breaks the connection between the leader 66 and the message sheet 63 and the guide bracket 65 prevents the message sheet 63 from wholly entering into the canister. The canisters are provided with rollers 79 and 80 over which the leader 66 and message sheet 63 ride during the rotation of the rolls 31 and 32.

Mounted on each of the canisters 27 in proximity to the guide bracket 65 is an angle clip 81 supporting a switch 82, such as a micro switch, sensing the movement of the bar 64 into the guide bracket 65 for purposes as hereinafter more clearly set forth.

The viewing area is provided with a backing surface 83 against which the message sheets 63 are adapted to be unwound and displayed. Suitable means should be provided whereby the message sheets 63 cooperate with the backing surface 83 to be held in position thereon during the display of the message to protect the message sheets from damage due to wind and other factors. In the example shown, the attaching means includes a plurality of magnetic bars 86 secured in the backing surface 83 and the metal strips 85 attached to the sheet 63 and cooperating with the magnetic bars 86. In this way as the message sheet is unrolled, the magnetic bars 86 and metal strips 85 will come into proximity with each other and will be attracted to hold the message sheet 63 on the backing surface 83.

As hereinbefore stated, it is desired that the message sheet 63 be unrolled for laying down on the backing surface 83 and be rolled up when picked up from the backing surface 83. This is accomplished by providing the roller bars 87 which are adapted to come into contact with the rollers 33 and 34 of each of canisters 27 as they move across the viewing area. Each of the rollers 33 and 34 is provided with a spring loaded idler roller 88 which is adapted to engage the opposite side of the roller bar 87 from the side engaged by the rollers 33 and 34 to hold the rollers in rolling engagement therewith and prevent the sliding of the rollers, particularly roller 33, on the surface of the roller bar 87. The roller bars 87 will be above and below the viewing area. Each idler roller 88 is mounted on an arm 90 which is pivotally connected to one end of a canister 27. Further, the spring 91 connects from the clip 92 to the arm 90 to urge the roller 88 in a direction toward its particular roller 33 or 34. This structure is best illustrated in FIGURES 7 and 8, it being understood that the roller 88 for roller 33 is not illustrated in order to show other details of structure. The engagement of the rollers 33 and 34 with the roller bar 87 will assure that the roll 31 will be wound up while the roll 32 is unwound during movement of the canister 27 across the viewing area V.

From the drawings it can be seen that when one of the canisters 27 has been moved across the viewing area, each message sheet 63 will be secured to a leader 66 by the latching means. One of the message sheets will be wound on the roll 31 and remain connected to the roll 32 in its original canister. The other message sheet will be displayed in the viewing area and connected to the canisters positioned on opposite sides of the viewing area.

Figures 12, 13, 14:
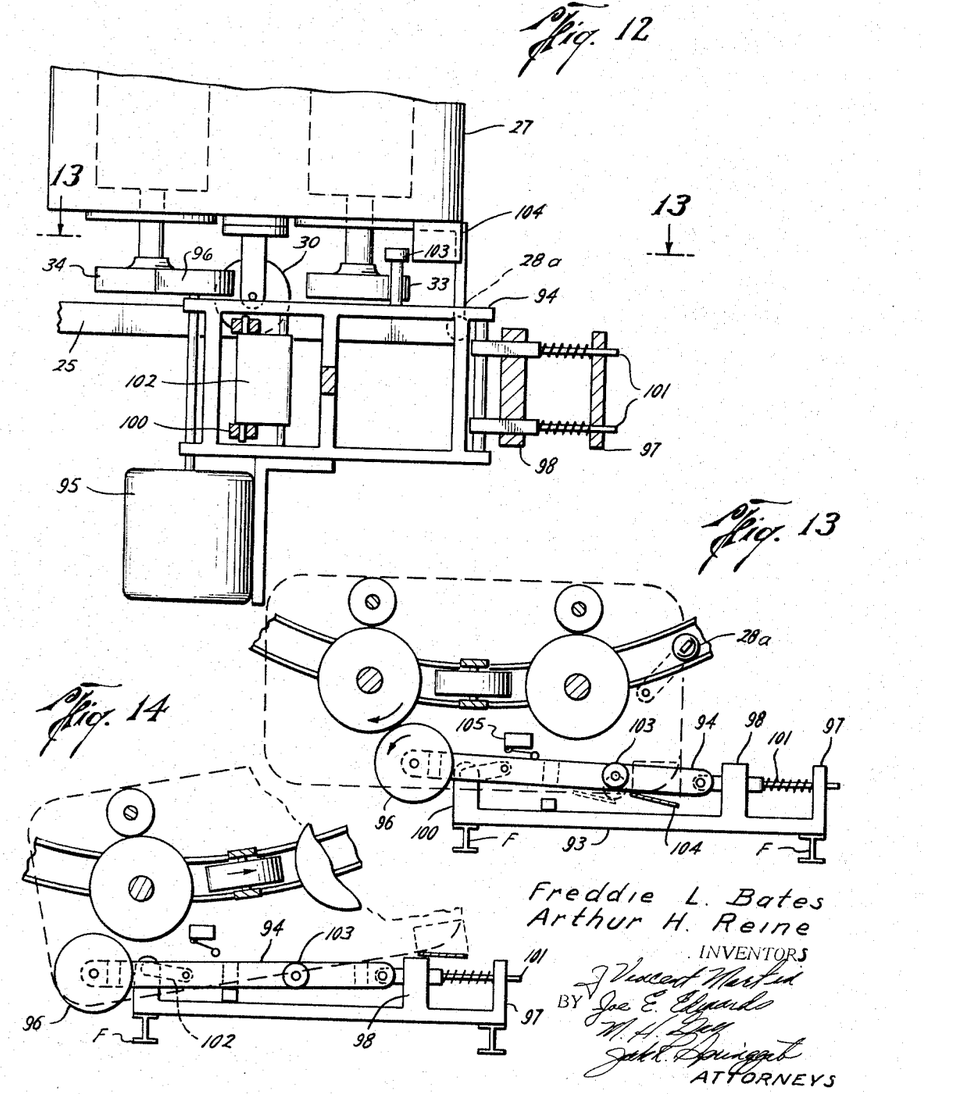
FIGURE 12 is a detail elevation view of the rewinding mechanism of the present invention.
FIGURE 13 is a sectional view of the rewinding mechanism taken along line 13—13 in FIGURE 12 and illustrating the rewinding of a display sheet from one roll to another in progress.
FIGURE 14 is a view similar to FIGURE 13 to illustrate the movement of the movable member and rewinding mechanism after the completion of the rewinding of the display sheet.

It is desired to have a suitable rewinding means to transfer each message sheet 63 back onto the roll 32 from the roll 31. This may be accomplished with a mechanism similar to the rewind mechanism illustrated in FIGURES 12. 13 and 14 or any other suitable rewind device. In the rewinding step when the bar 64 is engaged in the guide 65 as sensed by the switch 82, the rewinding mechanism will be shut off and also at this point the latch mechanism 60 will have been released by engagement of the arm 75 with the cam surface 76. When the sheet 63 has been rewound on its roll 32 and is disconnected from the leader 66, the canister containing the rewound sheet 63 is ready to be transferred from the arrival side R of the viewing area V back around the track to the departure side L of the viewing area V to be available for changing the message in the viewing area by unrolling its message while it rolls up the message of the preceding canister.

The rewinding mechanism illustrated in FIGURES 12, 13 and 14 includes support structure 93 connected to the frame F of the device and a spring-loaded arm 94 supporting the driving means 95 and the drive wheel 96 which is secured on the shafts of drive means 95. The structure 93 includes upstanding legs 97, 98 and 100. The arm 94 is pivotally connected to the spring-loaded plungers 101 which extend through the legs 97 and 98 and are springloaded to push the arm 94 in a direction to the left in the figures. The arm 94 is also connected by the link 102 to the leg 100 with the link 102 being pivotally connected both to the arm and to the leg 100. The cam follower 103 is secured to one side of the arm 94 and is adapted to be engaged on the inside of the plate 104 which depends from the canister 27 to actuate the rewind mechanism. Engaging of follower 103 on the inside of the plate 104 will cause the follower 103 and the arm 94 to be moved toward the canister so that the drive wheel 96 will engage roller 34. This movement will actuate the switch 105 which will start the rewind mechanism. Upon completion of the rewinding, the bar 64 will actuate the switch 82 to shut off the rewind drive means 95. Thereafter, as soon as the canister 27 is urged forward to a new position, it will move the arm 94 back to its original starting position illustrated in FIGURE 14, and the spring loading of the plungers 101 will hold the arm 94 in such position since the link 102 will have moved past center in its pivot with the leg 100.

The operation of the display device is controlled by the timer 57 and by the speed of movement of the chains 23. Referring to the FIGURES 4, 5 and 6, the position of the equipment illustrated in such figures is shown to illustrate the timing and coordination of movement of the canisters. The canister 27a illustrated in FIGURE 4 has just completed its passage across the viewing area V, the roller 53 on the arm A-3 is engaging the cam track 55 so that the arm is almost disengaged from the clip 35. The springloaded latch 62 has engaged the clip 36 to hold the canister 27a on the arrival side R of the viewing area V. Also, the canister 27a has abutted canister 27b and pushed it to the position illustrated wherein the rewinding mechanism has been engaged for rewinding of the previously displayed message sheet 63 from the roll 31 of the canister 27a onto the roll 32 of the canister 27b. The canister 27c is illustrated in two positions in FIGURE 4 to detail its movement as it progresses from the arrival side of the viewing area to the departure side. The first position is in abutting relation to the canister 27b with the cam track 55 tapering outward so that an arm will engage the clip 35 of the canister 27c. The position of the canister 27c at the top of the figure illustrates the movement of the canister 27c around the back side of the device. To the left lower side of the figure, the canister 27b is in engagement with the canister 27e. The canister 27e is being held in position at the departure side of the viewing area by engagement of the solenoid actuated latch 60 with the clip 36. Also, the message sheet 63 from the canister 27a is secured to the leader 66 of the canister 27e. Such message sheet is spread out on the backing surface 83 in the viewing area V between the canisters 27a and 27e, having been unrolled during the movement of canister 27a across the viewing area.

Figures 5, 6:
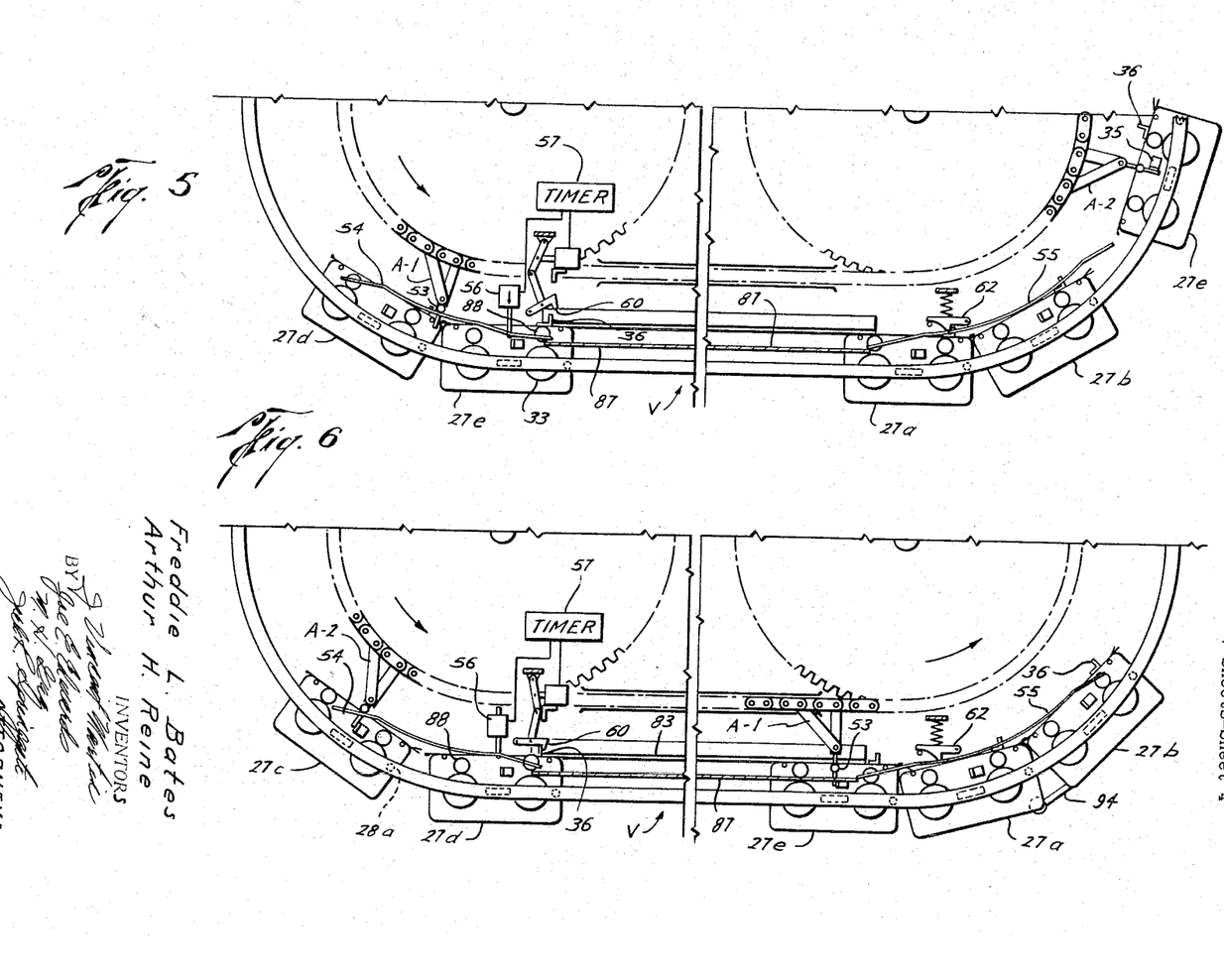
FIGURE 5 is a partial plan view similar to FIGURE 4 to illustrate the movement of one movable member from the arrival side of the viewing area to the departure side or originating side of the vewing area and the beginning of another movable member across the viewing area.
FIGURE 6 is another plan view similar to FIGURES 4 and 5 and illustrating the movable member just before it completes its return to the originating side of the viewing area and the other movable member as it approaches the arrival side of the viewing area.

In FIGURE 5 only a portion of the system is illustrated, it being noted that the same five canisters are in use as shown in FIGURE 4; canister 27a having immediately been moved to the arrival side of the screen; canister 27b positioned in the rewind position; canister 27c being returned to the departure side of the viewing area; canister 27d being positioned in stand-by relation at the departure side of the viewing area; and canister 27e in position to be moved across the viewing area. The arm A-1 which is about to pick up the canister 27e has its wheel 53 engaged with the track 54. The movable portion of track 54 has been actuated by the solenoid 56 to allow the arm A-1 to pick up and move the canister 27e across the viewing area. At the same time the solenoid 58 has been actuated by the timer to retract the latch 60 from the clip 36 to release canister 27e from its locked position to be ready for movement across the viewing area. It should be noted that the roller 33 on the canister 27e and its accompanying spring-loaded idler roller 88 are in engagement with the roller bar 87 so that the canister 27e will wind up the message sheet on its roll 31 while moving across the viewing area. As the canister 27e is engaged, it will move forward across the viewing area and the engagement of the latching mechanism between sheet 63 of canister 27e and the leader 66 of canister 27d will pull the canister 27d into the position at the departure side of the viewing area. As soon as the canister 27e has moved out of such position, the solenoid 58 will be actuated to move the latch 60 into position for engaging the lock clip 36 on the canister 27d to hold it in desired position at the departure side of the viewing area.

The arm A-2 has just engaged the clip 35 on canister 27c in FIGURE 5 and is moving canister 27c around behind the device to the departure side of the viewing area to a stand-by position in engagement with canister 27d.

FIGURE 6 illustrates the equipment position at a time shortly after the illustration in FIGURE 5. The canister 27c is moving to the arrival position to abut the canister 27d and to cause the leader 66 of the canister 27c to be latched to the message sheet 63 of the canister 27d. Also, the roller 53 on the arm A-2 has engaged the cam track 54 and is about to disengage from the clip 35 on the canister 27c. The canister 27e has moved across the viewing area and is abutting the canister 27a. The clip 36 on the canister 27e is about to engage the curved surface of the spring-loaded latch 62. Also, the wheel 53 on the arm A-1 which is in engagement with the clip 35 on the canister 27e is about to engage the cam track 55 which will disengage such arm. The movement of the canister 27e will push the canister 27a to rewind position and will push the canister 27b from rewind position into pickup position past the end of the track 55 so that the arm A-1 will engage and pick up the canister 27b. The solenoid 56 has been actuated to position the movable portion of the track 54 inwardly to prevent engagement of the canister 27d by the next arm A-2 passing thereby. Also, the solenoid 58 has been actuated to move the latch 60 into engagement with the clip 36 locking the canister 27d at the departure side of the viewing area.

Several additional canisters may be used without departing from the concepts of the present invention. Care is taken to provide for the proper positioning and movement of the canisters. When additional canisters are used, sections are added to the track 54 and the track 55 whereby the additional canisters may be stored at either or both sides of the viewing area.

In the form of the invention illustrated, the messages are changed by unwinding one message sheet from the trailing or dispensing roll of the canister moving across the viewing area, while the lead or take-up roll of the same canister is winding up the previously displayed message sheet. The winding and unwinding of the rolls is responsive to the movement of the canister by the engagement of the rollers 33 and 34 with the roller bar 87. With this structure the movement of a canister across the viewing area will create the impression that it is erasing the old message and painting the new message in the viewing area. The dispensing and take-up of the message sheets 63 is therefore responsive solely to the movement of the canisters across the viewing area. The rolls therefore do not require any spring loading to cause them to take up a message.

As mentioned, the present invention may also be operated to change messages in a slightly different manner. Thus, if the message sheet to be displayed is wound on the roll 31 of a canister and is engaged to a leader extending from the trailing side of the canister, the movement of a canister across the viewing space will pull the message sheet from the roll of the canister at the departure side of the viewing area, while the previously displayed message is wound on the roll 31 responsive to the rolling engagement of roller 33 on roller bar 87. When a canister arrives at the arrival side of the viewing area, its message sheet will be wound on the proper roll and no rewinding step is necessary.

It is further contemplated that the present invention may be used to provide a display device with changing displays in two viewing areas. In this type of installation additional latches 60 and 62 will be needed on opposite sides of the second viewing area which will be on the back side of the device illustrated in the figures. Additionally, tracks 54 and 55 will be changed to accommodate the second viewing area or new tracks similar to tracks 54 and 55 will be added for the new side. In such double display device the minimum number of canisters which will be needed will be at least five with more canisters being preferable.

From the foregoing description it can be seen that the present invention provides a method of and means for changing messages in a display device in a manner which is believed to be an attraction and without use of the usual spring-loaded, window-shade type of rolls. Further, the message sheets are wound and unwound in sequence responsive to the movement of movable members across the viewing area with the members being releasably connected for return of each member to the originating side of the viewing area independently of the other members.

What is claimed is:

1. The method of changing display sheets in a viewing area of a display device with at least three movable members, each movable member having a display sheet attached to a roll and a releasable latch to connect a display sheet to the movable member, a first and a second movable member positioned on one side of the viewing area and a third movable member positioned on the opposite side of the viewing area with a display sheet connected across said viewing area between said first and said third movable members comprising, connecting a display sheet between said first movable member and said second movable member, moving said first movable member across said viewing area, retaining said second and third movable members at their respective sides of the viewing area while said first movable member is moving across said viewing area, simultaneously unwinding the display sheet connected between said first and said second movable members from a wound roll to position said display sheet in the viewing area and winding the display sheet connected between said first and third movable members onto a roll, disconnecting the releasable connection of the display sheet previously between said first and third movable members, moving said third movable member into position with said second movable member on the originating side of said viewing area, and repeating the steps to display the display sheets wound in said movable members in sequence in said viewing area.

2. The method of changing display sheets in a viewing area of a display device with at least three canisters, each canister having two rolls on which display sheets may be wound and with a first and a second canister positioned on one side of the viewing area and a third canister positioned on the opposite side of the viewing area with a display sheet connected across said viewing area between said first and said third canisters comprising, connecting the end of a dsplay sheet which is wound upon a roll in said first canister to an empty roll in said second canister, moving said first canister across the viewing area, retaining said second and third canisters at their respective sides of the viewing area while said first canister is moving across said viewing area, simultaneously unwinding the display sheet from the wound roll of said first canister to position said display sheet in said viewing area and winding said display sheet in said viewing area onto an empty roll of said first canister while said first canister moves across said viewing area, transferring said sheet from said first canister to said third canister by unwinding the wound display sheet from said roll of said first canister and rewinding it onto a roll in said third canister, disconnecting said rewound display sheet from said first canister after said rewinding has been completed, moving said third canister into position with said second canister on the originating side of said viewing area, and repeating said cycles to display the display sheets wound in said canisters in sequence in said viewing area.

3. The method of changing display sheets in a viewing area of a display device having at least three canisters, each canister having two rolls on which display sheets may be wound, a first and a second canister positioned on one side of the viewing area with the first canister latched to prevent its movement into the viewing area, a third canister positioned on the opposite side of the viewing area and latched to prevent its movement into the viewing area and a display sheet connected across the viewing area between said first and said third canisters comprising, connecting the end of a display sheet which is wound upon a roll in said first canister to an empty roll in said second canister, releasing the latch engaging said first canister, latching said second canister to prevent its movement into the viewing area, moving said first canister across the viewing area from said one side to said opposite side of said viewing area, simultaneously unwinding the display sheet from the wound roll of said first canister to position said display sheet in said viewing area and winding said display sheet in said viewing area onto an empty roll in said first canister when said first canister moves across said display opening, latching said first canister on said opposite side of said viewing area to prevent its movement back into said viewing area, transferring the display sheet wound on a roll in said first canister to said third canister by unwinding the wound display sheet from said roll of said first canister and rewinding it onto its roll in said third canister, disconnecting said rewound display sheet from said first canister after said rewinding has been completed, moving said third canister into position with said second canister on said one side of said viewing area, and repeating said cycles to display the display sheets wound in said canisters in sequence in said viewing area.

4. A display device comprising, a frame having a viewing area, conveyor means on said frame associated with said viewing area, at least three canisters supported on said conveyor means, said conveyor means providing for movement of said canisters individually across said viewing area from a departure side to an arrival side of said viewing area and for returning said canisters to said departure side other than across said viewing area, means for retaining canisters at the departure and arrival sides of said viewing area, each of said canisters having at least one roll, a display sheet connected to the roll of each canister, latch means releasably connecting said display sheet to another canister as each canister reaches the departure side side of said viewing area, means for rewinding each of said sheets on its roll, and means for releasing said latch means to disconnect the display sheet from the canister to which it is connected by said latch means.

5. A display device comprising, a frame having a viewing area, conveyor means on said frame associated with said viewing area, at least three canisters supported on said conveyor means, said conveyor means providing for movement of said canisters individually across said viewing area from a departure side to an arrival side of said viewing area and for returning said canisters individually to said departure side other than across said viewing area, means for retaining canisters at the departure and arrival sides of said viewing area, each of said canisters having a take-up roll and a dispensing roll, display sheets, one display sheet being connected to the dispensing roll in each canister, latch means releasably connecting said display sheet to the take-up roll of another canister as each canister reaches the departure side of said viewing area, means for rewinding each of said sheets on the dispensing roll before each canister is returned to the departure side of the viewing area, and means for disconnecting said display sheet from said take-up roll of another canister after rewinding of said sheet on its dispensing roll.

6. A display device according to claim 5 wherein said conveyor means comprises, an endless chain extending across said viewing area and around behind the viewing area, drive means connected to said chain to move said chain around its endless path, at least one arm connected to said chain and to engage with and disengage from said canisters, means urging said arm in a direction towards engagement with said canisters, and cam means moving said arm out of engagement with said canisters only when said canisters are properly positioned so that the canisters to be moved are engaged by said arm and moved to their next position before said arm is disengaged from said canister by said cam means.

7. A display device according to claim 5 wherein said conveyor means comprises, an upper endless chain extending across said viewing area and around behind the display sheets positioned in said viewing area, a lower endless chain extending across said viewing area and around behind the display sheets positioned in said viewing area, drive means connecting to said upper and said lower chains to move said chains across said viewing area and behind the display sheets in unison, at least one arm connected to each of said chains, the arm connected to the upper chain being substantially vertically above the arm connected to the lower chain, each of said arms being retractable from engagement with said canisters, and a cam track for each of said arms to hold said arms out of contact with the canisters which are not to be moved by the arms and to disengage the arms from the canisters when movement of the canisters is accomplished.

8. A display device according to claim 5 including, a backing wall in said viewing area against which the display sheets are to be positioned for display in said viewing area, a plurality of magnets in said backing wall, and a plurality of metal strips in each of said display sheets, the metal strips in said display sheets being positioned to be attracted by the magnets in said backing wall to retain the display sheets against said backing wall during their display in the viewing area.

9. A display device comprising, a frame having a viewing area, conveyor means on said frame associated with said viewing area, at least three canisters supported on said conveyor means, said conveyor means providing for movement of said canisters individually across said viewing area from a departure side to an arrival side of said viewing area and for returning said canisters to said departure side other than across said viewing area, means for retaining canisters at the departure and arrival sides of said viewing area, each of said canisters having at least one roll, a display sheet connected to the roll of each canister, a roller connected to each roll, a roller bar spanning the viewing area and adapted to be engaged by said rollers, latch means releasably connecting said display sheet to another canister as each canister reaches the departure side of said viewing area, movement of each canister across said viewing area with said roller in engagement with said roller bar rotating said roll to wind the display sheet in the viewing area onto said roll, and means for releasing said latch means to disconnect the display sheet from the canister to which it is connected by said latch means before said canister is returned to the departure side of the viewing area.

10. A display device comprising, a frame having a viewing area, conveyor means on said frame associated with said viewing area, at least three canisters supported on said conveyor means, said conveyor means providing for movement of said canisters individually across said viewing area from a departure side to an arrival side of said viewing area and for returning said canisters individually to said departure side other than across said viewing area, means for retaining canisters at the departure and arrival sides of said viewing area, each of said canisters having a take-up roll and a dispensing roll, a display sheet connected to the dispensing roll of each canister, latch means releasably connecting said display sheet to the take-up roll of another canister as each canister reaches the departure side of said viewing area, each of said rolls having a roller extending from said canister and adapted to wind and unwind said rolls, a roller bar spanning said viewing area, said roller bar positioned to be engaged by said rollers on said rolls of said canisters to unwind a display sheet from the dispensing roll and to rewind a display sheet on the take-up roll as the canister progresses across said viewing area, means for rewinding each of said display sheets from the take-up rolls to the dispensing rolls before each canister is returned to the departure side of the viewing area, and means for disconnecting said display sheet from said take-up roll of another canister after rewinding of said sheet on its dispensing roll.

11. A display device comprising, a frame having a viewing area, conveyor means on said frame associated with said viewing area, at least three canisters supported for movement by said conveyor means, at least one arm connected to said conveyor means and adapted to engage said canisters to move said canisters across said viewing area from a departure side to an arrival side of said viewing area and to return said canisters to said departure side other than across said viewing area, means for retaining canisters at the departure and arrival sides of the viewing area, each of said canisters having at least one roll, a display sheet connected to the throll of each canister, latch means releasably connecting said display sheet to another canister as each canister reaches the departure side of said viewing area, means for rewinding each of said sheets on its roll, means for retaining said canisters in a fixed position during rewinding of said sheets, means for disconnecting said display sheet from said other canister when it has been rewound on its roll, said arms being retractable from engagement with said canisters, a movable cam track on the departure side of said viewing area to disengage said arms from a canister being returned to said departure side and to maintain said arms from engaging the canisters to move them across said viewing area, and means moving said movable cam track to allow an arm to engage the canister at the departure side of said viewing area to move said canister across said viewing area.

12. A display device according to claim 11 including, a timer associated with said moving means for said movable track whereby the time of changing of display sheets in said viewing area is controlled by said timer.

13. A display device according to claim 11 including, a latch mechanism at the departure side of said viewing area to prevent movement of the carriage positioned at the departure side into said viewing area, and means releasing said latch mechanism simultaneously with the movement of said movable cam track whereby the canister to be moved across said viewing area is released from said latch mechanism before it is engaged by one of said arms.

14. A display device according to claim 11 including, a fixed cam track at the arrival side of said viewing area, said fixed cam track having a contour to retract said arm from a canister moving across said viewing area when said canister has completed its movement, and a latch on the arrival side of said viewing area adapted to engage a canister before said arm has retracted to prevent the canister from moving back into said viewing area.

15. A display device according to claim 14 wherein, said latch is provided with a sloping cam surface which engages a canister reaching the arrival side of said viewing area to retract said latch to allow the canister to move into latching position.

References Cited

UNITED STATES PATENTS

| 1,223,887 | 4/1917 | Kluchansky | 40—32 |
| 1,755,761 | 4/1930 | Armstrong | 40—31 |

FOREIGN PATENTS 515,123 10/1939 Great Britain.

EUGENE R. CAPOZIO, *Primary Examiner.*

R. CARTER, *Assistant Examiner.*